July 26, 1932.  A. V. DE FOREST  1,869,336

THERMAL METHOD OF TESTING METALLIC BODIES

Filed May 29, 1930  4 Sheets-Sheet 1

INVENTOR.
Alfred V de Forest.
BY
ATTORNEY

July 26, 1932.   A. V. DE FOREST   1,869,336
THERMAL METHOD OF TESTING METALLIC BODIES
Filed May 29, 1930   4 Sheets-Sheet 2
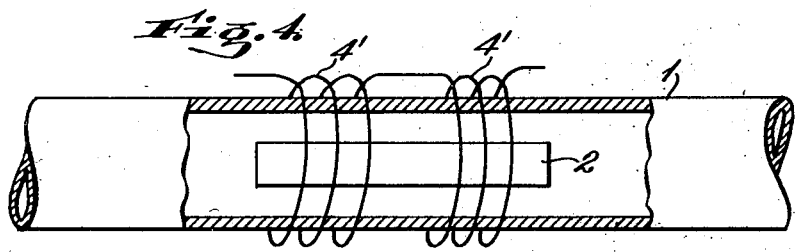
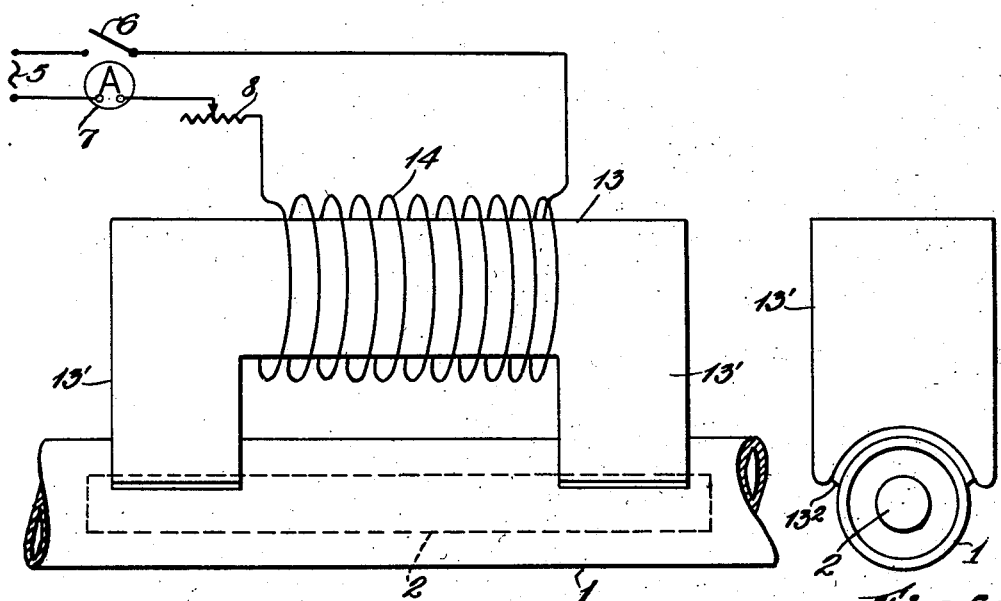
INVENTOR.
Alfred V. de Forest.
BY
ATTORNEY July 26, 1932. A. V. DE FOREST 1,869,336
THERMAL METHOD OF TESTING METALLIC BODIES
Filed May 29, 1930 4 Sheets-Sheet 3
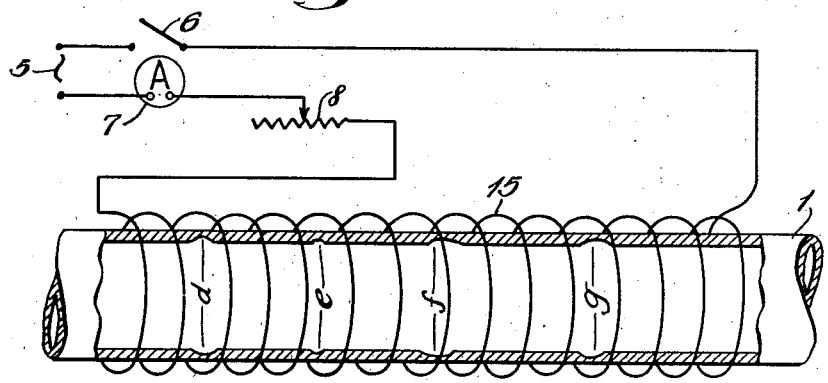
Fig. 6.
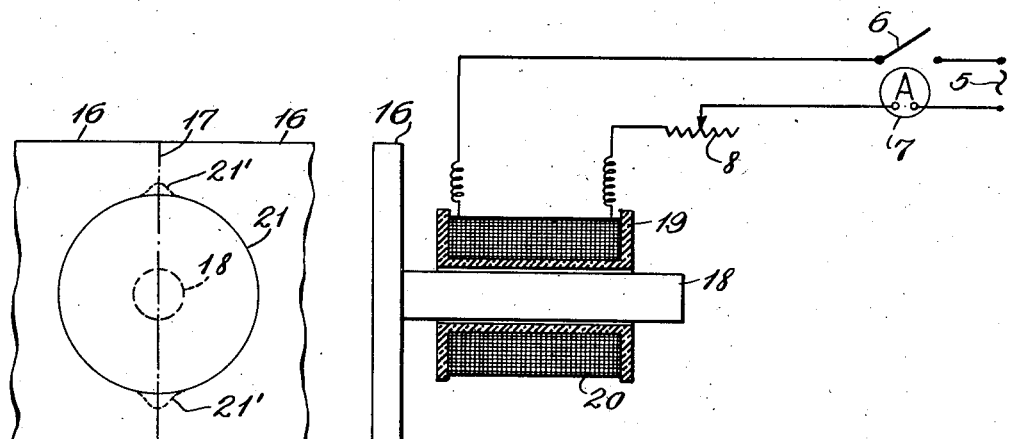
Fig. 7.
Fig. 7a.
INVENTOR.
Alfred V. de Forest
BY
ATTORNEY July 26, 1932.   A. V. DE FOREST   1,869,336
THERMAL METHOD OF TESTING METALLIC BODIES
Filed May 29, 1930   4 Sheets-Sheet 4
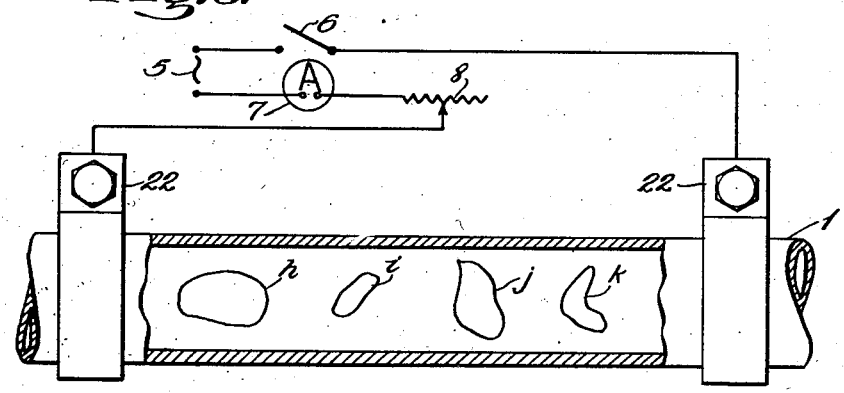
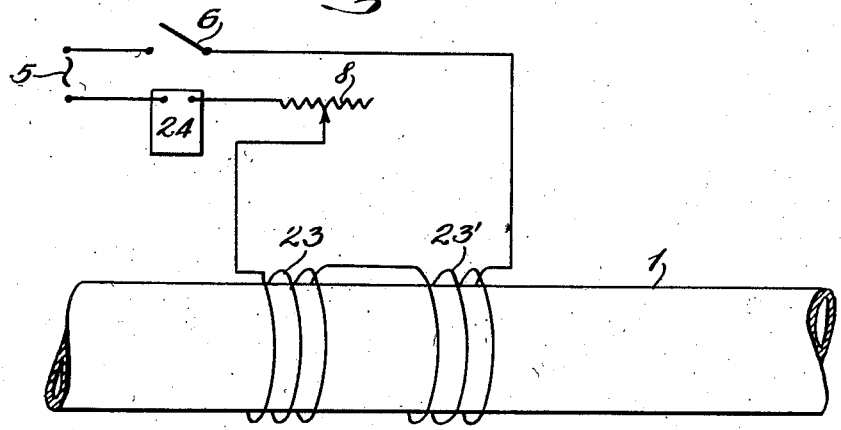
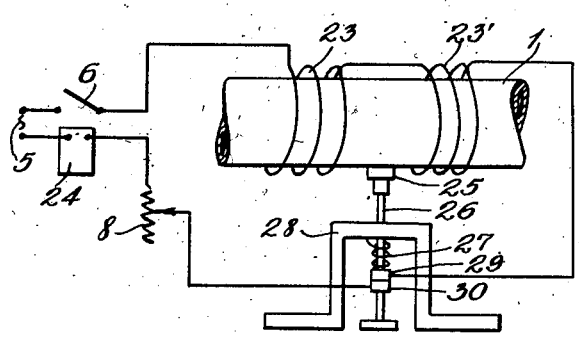
INVENTOR.
Alfred V. de Forest
BY
ATTORNEY Patented July 26, 1932

1,869,336

UNITED STATES PATENT OFFICE

ALFRED V. DE FOREST, OF SOUTHPORT, CONNECTICUT

THERMAL METHOD OF TESTING METALLIC BODIES

Application filed May 29, 1930. Serial No. 456,909.

This invention relates to thermal testing of metallic bodies and has for an object to determine the distribution of material in such bodies.

Another object is to provide a method of determining the quantity of material in a metallic body.

The invention is adapted to many uses, one of the most important of which lies in the field of testing the homogeneity of materials. It is especially efficient in the detection of non-uniformity of wall thickness, in pipes, tubes and casings of all kinds. It frequently occurs that the distribution of metal in such bodies is eccentric to a degree which affects their strength and utility. The method herein disclosed, by determining degree of equality in wall thickness, affords a means for rapidly examining pipe samples in the course of routine manufacture and thus provides a simple means, available to the manufacturers or users, for culling such lengths as fall below an accepted standard.

In its preferred form, the invention makes use of the heating effects of electric currents which are caused to flow in the body under test. The density of such currents, other things being equal, will be in inverse proportion to the cross-section of the shortest path, and means are provided for determining variations in such current density from which variations in section are directly determinable.

Other objects and applications of my invention will appear as the specification proceeds. For a better understanding of the invention reference is had to the accompanying figures in which:

Fig. 1a is a view in section taken on the line 1a—1a.

Fig. 4 is a view partly in longitudinal section and partly diagrammatic, showing an apparatus differing from that of Fig. 2 with respect to the location of the test windings.

Fig. 5 is a view in side elevation and partly diagrammatic of an apparatus employing a magnetizing yoke.

Fig. 5a is an end view of the same.

Fig. 6 is a view partly in longitudinal section and partly diagrammatic, illustrating the application of a test winding over the entire test body.

Fig. 7 is a fragmental plan view of a welded plate showing an isotherm thereon.

Fig. 7a is a view in section and partly diagrammatic of the apparatus used in making the test indicated in Fig. 7.

Fig. 8 is a view partly in longitudinal section and partly diagrammatic of an apparatus for carrying out my invention wherein the body under test is heated by electric current supplied from external sources.

Fig. 9 is a diagrammatic representation of an apparatus disposed for the measurement of the amount of material constituting the test body.

Fig. 9a is a view of another form of the apparatus illustrated in Fig. 9, showing an arrangement for automatically stopping the heating of the test body.

Figure 1:
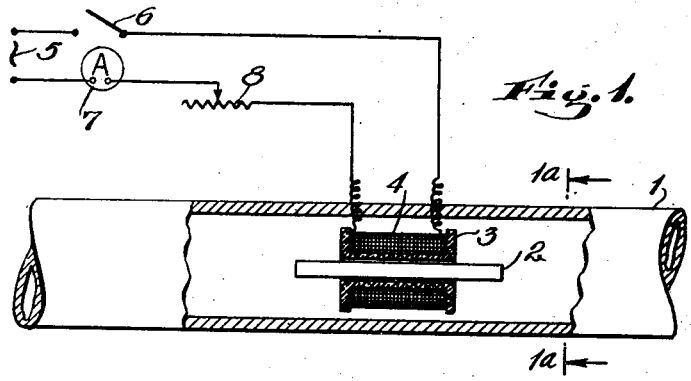
Figure 1 is a view partly in longitudinal section and partly diagrammatic of an apparatus for carrying out my invention, showing a single test winding combined with a magnetic core inserted within the body to be tested.

Referring to Fig. 1, there is disclosed in longitudinal section a pipe 1 within which is placed a cylindrical core 2 of magnetizable material, encircled at its middle region by an insulating spool 3, having a winding 4 symmetrically fixed with reference to the ends of the core 2. As shown, the core 2 is longer than the winding 4 for reasons to be hereafter explained. The winding 4 is connected to a source of alternating or otherwise varying electromotive force 5 through a switch 6, ammeter 7 and rheostat 8.

Figure 1A:
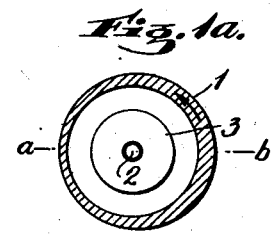

Alternating current flowing in the winding 4 induces an alternating magnetic flux in the core 2, and such alternating flux will then cause an alternating electric current to flow in the pipe 1, in a direction normal to the length of the pipe as indicated by the arrow in Fig. 1a. In other words, the pipe itself constitutes the closed secondary winding of a transformer, the winding 4 constituting the primary winding. For any given primary current in the winding 4, assuming the pipe to be of uniform dimensions and structure, the current flow in the pipe will have the maximum value in that length element centrally located with respect to the length of the core 2, since such length element is cut by the maximum number of lines of force. For each successive element of pipe length proceeding from such central element in directions toward the respective ends of the core, the induced current flow decreases in proportion to the falling off of number of lines of force in the core, due to magnetic leakage from such core. By suitable proportioning of the length of the core 2 with respect to the length of the winding 4, it thus is possible to taper the amount of current flow from a maximum in that length element of the pipe which is centrally disposed to the core, to a desired minimum in each direction.

To make the operation of my invention clear we will assume that the wall thickness of the pipe 1 is not uniform but has a minimum and maximum thickness corresponding to the respective ends of a diameter $a—b$, as shown in Fig. 1a. This simulates a situation which frequently arises in practice in cast pipe, for example, wherein the proper amount of metal is provided for the mold, but due to conditions not always under control, is disposed eccentrically to the pipe axis in the finished casting.

To illustrate the operation of the apparatus of Fig. 1, we will consider that it is desired to test the pipe 1 for variable wall thickness at its center region of length, conditions here being esteemed suitable for determining whether or not the casting as a whole is satisfactory. As a preliminary step I may coat the entire outside surface of the pipe, over a region at its center, with a substance which becomes fluid at a suitable temperature. One such material which I have used is stearin, which melts at about 160° F. This may be rubbed on, particles adhering by friction, or it may be melted and brushed on, subsequently being permitted to congeal which occurs rapidly when the pipe is cool.

Thereafter, with the core 2 having winding 4 inserted within the pipe 1 at its center region, current is allowed to flow in the winding 4 by closing switch 6, the rheostat 8 being adjusted until a suitable value of current is indicated by ammeter 7. The amount of current required is a matter of judgment and experience and when properly selected the electric currents induced in the pipe 1 in a direction normal to its axis quickly raises the pipe temperature to such a degree as to cause melting of the stearin, this melting generally occuring first at that region of the pipe which is located correspondingly to the identical centers of the core 2 and winding 4, since here the induced current is a maximum, and proceeding at a slower rate in either direction therefrom. When the melting has been carried out over a suitable length of pipe, a length somewhat shorter than the length over which the stearin is applied, heating is stopped by the opening of switch 6 and cooling of the pipe and its stearin coating is allowed to take place.

Figure 1B:
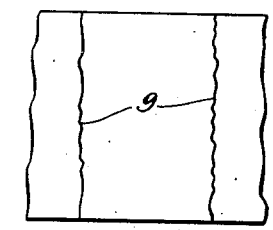
Fig. 1b is plane development of the surface of the test body with lines of equal temperature, or isotherms thereon, the regularity in spacing of the isotherms indicating uniformity in section of the test body.
Figure 1C:
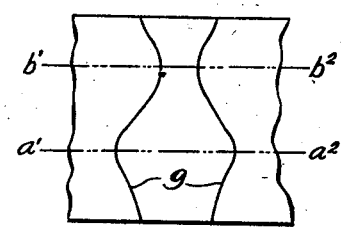
Fig. 1c is a similar view representing isotherms indicating irregularities in section of the test body.

When congealing of the melted stearin is effected, it will be found that there are lines of demarcation, on either side of the pipe center, between the recongealed stearin and the stearin which was not permitted to melt. Such lines of demarcation constitute isotherms, or lines of equal temperature. If the pipe wall is of uniform thickness these isotherms will uniformly space apart at all points about the pipe, as shown in Fig. 1b which represents a developed surface of a satisfactory pipe, the isotherms being represented at 9. However, in the case of the non-uniform wall conditions of the pipe shown in Fig. 1a, the isotherms are not equally spaced apart, the distance between them being the greater, the less the thickness of the pipe in that region. The effect is in general two-fold: 1. The higher current density resulting from the minimum wall thickness causes a higher temperature to be attained with a resulting "bulging out" of the isotherms at that region; 2. The restricted cross-section of path in the thin wall region causes an abnormal current distribution, raising adjacent elements of the pipe length to a higher temperature than would normally result from the effects of linkage lines of forces. This is shown in Fig. 1c, representing a developed section of pipe 1, where the distance apart of the isotherms 9 is a maximum in the region of the line $a^1—a^2$, corresponding to $a$ of Fig. 1a, and a minimum in the region of the line $b^1—b^2$, similarly corresponding to $b$ of Fig. 1a.

Figure 1D:
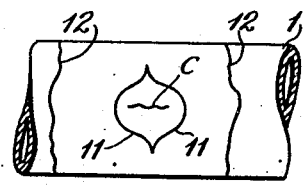
Fig. 1d is a similar view representing isotherms indicating the presence of a flaw.

The effect of a non-uniformity or inhomogeneity other than that of the non-uniform wall thickness thus described may be seen by reference to Fig. 1d wherein the pipe 1 has a fissure C, such fissure representing a whole or partial discontinuity. When an element of pipe length embracing such a fissure is tested with the apparatus shown in detail in connection with Figs. 1 and 1a, a portion of the applied coating as embraced by the isothermals 11 tends to remain unmelted, since the electrical resistance of the wall at that region is relatively very great and the current is diverted to the right and left of the fissure region. The isotherms then observed are of multiple character; an inner pair 11 about the fissure region, local thereto and bounding an unmelted portion of the applied coating and an outer pair 12 traversing the pipe periphery and indicating its characteristics with respect to a major element of length. Whether or not the isothermal lines 12 indicate the abnormality of the fissure C depends upon the extent of the fissure with reference to the element of pipe length under examination.

In the operation of my invention it is important that temperature equilibrium cannot take place through conduction, except in so far as heat diffusion is the direct result of nonuniformity, in the interval between closing and opening the electric circuit of the winding 4. The desired conditions to this end are brought about by using high values of current in the winding 4 and making the rate of heating greater than the rate of normal diffusion of the heat by conductivity. I find it is advisable to have the core 2 longer than the coil 4, in order to rather definitely displace the region of minimum induced current from that of the maximum induced current and thereby have the temperature gradient for pipe of uniform wall section under definite control. In the case of pipe of non-uniform wall section, the effect of the non-uniformity is thus accentuated, as the temperature gradient at the minimum thickness region is thereby increased. Since the rate of transmission of heat by conduction is proportional to such temperature gradient, this serves in a measure to accentuate the relative displacement of the isothermal lines.

While there are advantages in employing the magnetizing element of Fig. 1 in the form consisting of a single magnetizing winding 4 encircling an extended core 2 of magnetic material, the latter being so dimensioned with respect to the magnetizing winding as to effect the desired temperature gradient along the central length of the pipe 1, there are other highly efficient means of effecting the same result, which fall within the scope of my invention. Some of these other forms of apparatus are shown in the drawings and it will be observed that I use the same reference numerals throughout to indicate corresponding parts.

Figure 2:
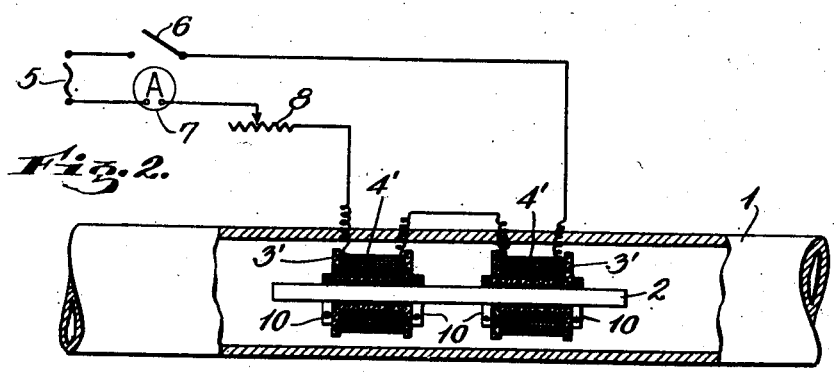
Fig. 2 is a view in longitudinal section of an apparatus differing from that of Fig. 1 in that the single test winding is replaced by a multiple test winding.

In Fig. 2, I illustrate a pipe 1 within which is a core 2 encircled with magnetizing windings 4', 4' arranged on spools 3', 3'. The windings 4', 4' are connected in series assisting to a source of alternating electromotive force 5 through a switch 6, ammeter 7 and rheostat 8, as in the case of the apparatus of Fig. 1.

By suitably disposing the windings 4', 4' with respect to the length of the core 2 and adjusting the current which is allowed to flow therethrough to a proper value by means of a rheostat 8, a condition can be brought about in which the maximum magnetizing effect on the core 2 is at its center of length, from which point the magnetizing effect decreases to a minimum at either end of the core. This arrangement has the great advantage of considerable flexibility in permitting the one magnetizing element to be adjusted to widely varying conditions of test. For example, I may fix the windings 4', 4' in any desired position on the core 2 by means of adjustable collars 10 which are clamped upon the core at either end of the spools 3' for the purpose of retaining such spools in place.

Figure 3:
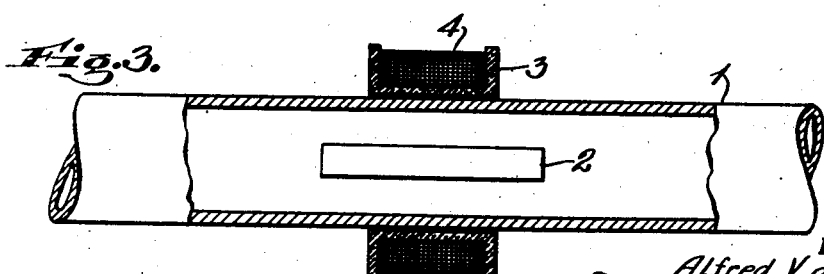
Fig. 3 is a view in longitudinal section of an apparatus differing from that of Fig. 1 in that the test winding encircles the body.

Again there are circumstances of test under which it is not feasible or desirable to place the magnetizing winding of the core 2 within the pipe or tube, in which case I may, as shown in Fig. 3, arrange the magnetizing winding exterior to such pipe while the core is placed within the pipe. Referring to Fig. 3, the pipe 1 is encircled at its center with a magnetizing winding 4 arranged on a spool 3 positioned centrally with respect to the ends of a core 2 which is located in the interior of the pipe 1. As before, the winding 4 is connected to a source of alternating electromotive force, through the necessary control apparatus, the operation being entirely similar to the operation of the apparatus of Fig. 1.

Instead of employing one magnetizing winding exterior to the pipe 1 may, as illustrated in Fig. 4, employ two magnetizing windings. Referring to Fig. 4, the single winding 4 of Fig. 3 is here replaced by two exterior windings 4', 4'; diagrammatically shown, which are connected in series assisting and are similarly placed with reference to the ends of the core 2, which latter is inserted within the pipe 1. The external electrical connections to the apparatus of Fig. 4 and the operation is similar to the operation of the apparatus of Fig. 2.

There are circumstances of test, in the carrying out of my invention, under which it is desirable to effect the magnetizing of such a core as 2 of Figs. 1, 2, 3, and 4 by other means than directly through a magnetizing winding and in Fig. 5, I show the use of a coil and magnetizing yoke for such purpose. Referring to Fig. 5 the pipe 1 has a core 2 at its center, as indicated by the dotted lines. Exterior to the pipe 1 is a U-shaped yoke 13, of magnetic material, having polar projecting ends 13', 13'. The yoke is encircled, as shown diagrammatically, by a magnetizing winding 14 which is connected to a source of alternating or otherwise varying electromotive force 5 through a switch 6, ammeter 7 and rheostat 8. The yoke 13 is preferably disposed with its center of length coincident with the center of length of the core 2. The polar projections 13' of the yoke 13 have preferably circularly shaped ends which may be arranged so as to contact with the exterior surfaces of the pipe 1. For many purposes of test, however, I prefer that such poles do not make direct magnetic contact with the pipe surface, and in Fig. 5a, which is an end elevation of Fig. 5, I show means for maintaining the yoke pole faces at a predetermined distance from the pipe surfaces. Referring to Fig. 5a, the circularly shaped pole faces of the polar projections 13' are fitted with arcuate non-magnetic shoes, as indicated by 13², which latter themselves contact with the exterior surfaces of the pipe 1. The non-magnetic shoes 13² may be dispensed with and in effect replaced by equivalent air gaps by providing means for maintaining the faces of the yoke poles 13' at a constant suitable distance from the pipe surface during the course of a test.

In the operation of the apparatus of Fig. 5, current is allowed to flow through the winding 14, from the source of electromotive force 5 by closing switch 6, the value of this current being adjusted by means of rheostat 8. Lines of force thereupon thread the core 2, as in the case of the cores 2 of the apparatus of Figs. 1, 2, 3 and 4. If the exterior surface of the pipe 1 in that region which lies between the polar projections of the yoke 14 has previously been coated with a suitable material having a low melting point and the current is cut off after the proper interval, isothermal lines of the order of those indicated in Figs. 1b or 1c will appear, according as to the uniformity of wall thickness of the pipe.

I find it possible in many cases to dispense with an interior iron core and to rely upon the heating effects of currents induced by the alternating lines of force traversing the pipe. For example, in the case of the apparatus of Fig. 3, the magnetizing current flowing in the winding 4 induces alternating lines of force in the pipe in the direction of the pipe length. Such lines of force cause currents to flow around the pipe in a direction normal to its length. By proper adjusting of the magnetizing current in the winding 4, these currents can be made of sufficient magnitude to cause variations in temperature proportional to the thickness of the pipe or tube wall and thus give a test result equivalent to that obtained when the core is used. Quite similar results may be produced with respect to the apparatus of Figs. 4 and 5, when the cores 2 corresponding to such figures are removed, since in the case of Fig. 4 the pipe is directly magnetized through the action of the windings 4', 4' and in the case of Fig. 5 through the direct action of the yoke 13. The ability to dispense with the use of the interior core is of great advantage particularly where the pipe, tube or casing forms part of a permanent structure and it is desired to determine, without interruption to service, the condition of material subject to erosion, corrosion, etc.

It is not to be assumed that the tests carried out according to my invention must necessarily be restricted to a limited region along the length of a body, such as the pipe 1 of Fig. 3 wherein the winding 4 is shown encircling the central region of the pipe length. While the winding 4 and associated core 2 may be jointly moved along the length of the body 1 so as to successively test individual length regions, information being thus derived as to the characteristics of such body along its entire length, I sometimes find it advantageous to test the whole length of the body in the one operation and in Fig. 6, I show one embodiment of my invention for the purpose. Referring to Fig. 6, a pipe or tube 1 of magnetic or non-magnetic material is encircled by a solenoidal winding 15 shown diagrammatically, which winding is preferably made up of several layers of wire in one continuous length. The winding 15 is connected as before to a source of alternating or otherwise varying electromotive force 5 through a switch 6, ammeter 7 and rheostat 8.

As disclosed in the view of the body 1 of Fig. 6, this body has several interior imperfections as at $d$, $e$, $f$ and $g$, which represent the effects of erosion, corrosion or other flaws incident to fabrication or evolved in the course of its use. If a coating of fusible material is applied to the surface of the body 1 and current is allowed to flow in the solenoidal winding 15 through the closing of switch 6, the body is traversed by a magnetic flux having the same direction as its length, with the result that currents are caused to circulate in the body in directions normal to such length. The presence of flaws or the diminution of wall sectional area resulting from other factors causes these induced currents to deviate from their normal current paths with irregular conditions of melt with respect to the applied coating, from which the presence and to some extent the type of the irregularities can be determined.

In Fig. 7a, I show a further form of apparatus for carrying out my invention in which the test determinations are also effected by the heating action of eddy currents. Referring to Fig. 7, two sections of plate, 16, 16 formed of magnetic material, are shown welded together along a region designated by the dot-and-dash line 17. The purpose of the test is to determine the soundness of the weld and to this end I employ a cylindrical core 18 of magnetizable material upon which is mounted an encircling spool 19, carrying a magnetizing winding 20, as shown in more detail in Fig. 7a which is a view in end elevation of Fig. 7. The magnetizing winding 20 is connected to a source of alternating or otherwise varying electromotive force 5 through a switch 6, ammeter 7, and rheostat 8.

In the operation of the apparatus of Fig. 7, I first apply over the surface of the structure 16, 16, in the region of the weld, a substance which melts at a suitable temperature. I then apply one end of the core 18 to the structure 16, 16 in such manner that the core 18 is held substantially perpendicular to such plate and in contact therewith centrally to the welded region 17, as indicated by the broken line circle 18 in Fig. 7. When the switch 6 is closed and the current in the magnetizing winding 20 is adjusted to the proper value by means of the rheostat 8, lines of force are induced in the structure 16, 16 which distribute themselves in such structure as to have a general radial direction away from the contact region of the core 18. The eddy currents induced in the plates 16, 16 will so heat the plates in the region of influence of the core 18 that the applied coating will begin to melt in the region of contact, the melting proceeding more or less radially therefrom until further heating is stopped by the opening of the switch 6. An isothermal line, as 21, will then be observed, positioned more or less concentrically to the axis of the core 18, this line showing no marked irregularity at the weld regions at either side of the core contact provided such weld region is sound. If the latter is unsound, that is, if there is a faulty weld, it will be found that the isothermal line indicates excessive heating at the weld due to the high resistance offered to the passage of the eddy currents at that region. The indication of a faulty weld is typified by the dotted portions shown at 21′, 21′ of Fig. 7. It will be obvious that by moving the core successively to various locations along the welded region, tests at different points may be made.

It is possible to employ my invention under circumstances wherein the determination of irregularities or inhomogeneities is effected by the heating due to electric currents emanating from an outside source which are caused to traverse the body, with or without the aid of heating effects resulting from eddy or other induced currents set up by such applied current, as in Fig. 8, I show an arrangement whereby this may be accomplished. Referring to Fig. 8, a pipe or tube 1 has affixed to its ends contact clamps 22 which are connected to a source of electromotive force 5 through a switch 6, ammeter 7 and rheostat 8. The source of electromotive force 5 is preferably of an alternating or otherwise varying character although, as explained later, a constant potential source of current may at times be advantageously employed. As indicated, the pipe 1 has several interior irregularities with respect to its wall section as at $h$, $i$, $j$ and $k$, these being either incidental to manufacture or the result of the use of the body. When current is permitted to traverse the pipe 1 through the closing of the switch 6 the restricted sectional areas resulting from the imperfections cause unequal heating effects which are discoverable by the employment of an indicating means, such as the fusible coating heretofore described. In the event that the pipe 1 is of magnetic material, the varying current traversing the pipe causes magnetic flux to be induced at all regions of its length in a direction normal to the direction of flow of such current, which tends to accentuate the local heating effects in the vicinity of the flaws $h$, $i$, $j$, $k$. While the use of alternating or otherwise varying current is particularly effective in the case of the apparatus of Fig. 8, it will be apparent that direct current may be employed for the detection of irregularities where the direct heating effects of the applied current alone can be depended upon to give the required indications of irregularities.

In the methods of applying my invention which have been so far described, the objects in general have been to detect inequalities in distribution of material or the presence of inhomogeneities or flaws. My invention however is equally well adapted to the determination of the amount of material in a given region or portion of a body. That is, considering such a body as a pipe, it may well happen that the wall thickness is entirely uniform but, from a variety of causes may be greater or less than is desired. In Fig. 9, I show an arrangement wherein the amount of heat energy required to bring about a rise of temperature of a certain degree is utilized as an indication of the amount of material located at the region under test. In Fig. 9, I show a pipe or tube 1 of magnetic material, encircled by windings 23, 23′ shown diagrammatically, which are joined in series assisting and connected to a source of alternating or otherwise varying electromotive force 5, through an ampere-hour meter 24, a switch 6, ammeter 7 and rheostat 8. Under a proper adjustment of the position of the windings 23, 23′, relative to each other, the heating effects resulting from eddy currents induced by the currents in such windings will be at a maximum at a region midway between such windings. Preliminary to the use of the apparatus for determining the amount of material at that region, an experimental study must be carried through on the particular size and class of material to be investigated to determine the current to be supplied to the windings 23, 23' to raise a given mass of material to a definite temperature in a given time. When this is known, a length of such material is inserted within the windings 23, 23' for test and the exterior surface of the pipe 1 coated with a material which fuses at the aforesaid definite temperature. Following this, the switch 6 is closed and the rheostat 8 adjusted until the proper current is flowing in the windings. When the coating is observed to fuse at any spot in the region under observation the switch 6 is opened and the reading of the ampere-hour meter observed as a measure of the mass of material in the body in the test region, from which the average thickness of wall may be calculated. Where the body 1 is of non-magnetic material it is desirable to place a magnetic core within the body, in order that the heating effects will be accentuated.

Instead of using a fusible coating applied about the exterior surface of the test body between the windings 23, 23' as a means of indicating when a certain temperature is reached through the melting of such coating, I may make use of a limited amount of such fusible material in the form of a button which is caused to adhere to a spot on the exterior surface and cause the melting of this button to automatically cut off the current supply, as shown by Fig. 9a. Referring to Fig. 9a, a button of fusible material 25 is shown in contact with the pipe 1 being held in position against such pipe by means of a plunger rod 26 which is retained against the button 25 by means of a tension spring 27 affixed at one end to the rod 26 and at the other to a plunger rod support 28. At the free end of the rod 26 is a contact 29 which engages with a second fixed contact 30. The windings 23, 23' are connected in series assisting to the source of electromotive force 5, through the switch 6, ammeter 7, rheostat 8, ampere-hour meter 24 and contacts 29 and 30 as shown. When the temperature of the pipe 1 reaches that degree which causes fusion of the button 25 the plunger rod 26 moves upward in such manner that the connection at the contacts 29 and 30 is broken, thereby automatically opening the heating circuit.

The form of apparatus and the procedure employed in carrying out my invention must necessarily be selected in accordance with the particular test in hand. For example, the apparatus of Fig. 1 is particularly well adapted to the determination of the wall thickness of engine cylinders, when cast singly or in a block, in which later case the core 2 with associated winding 4 is placed within the cylinder, the inner wall surface being coated with the fusible indicating material. It may be pointed out here that the apparatus of Figs. 1, 2, 3, 4 and 5 is adapted to the determination of the thickness of a protective wall or shell in duplex material, as for example, copper weld products, wherein the section portions have different electrical conductivities. That portion of the section having the highest conductivity will heat more rapidly than the portion of low conductivity, leading to a differentiation as to degree of thickness of the high conductivity portion from point to point.

While in describing my invention I have spoken specifically of the employment of a coating of fusible material, rubbed on, or melted and brushed on, as a means of delineating isotherms or for the purpose of indicating the attainment of a certain temperature, I do not limit myself to a temperature indicating material as applied in such manner. I may, for example, wrap the body under test or otherwise apply to one of its surfaces a substance such as paper which has been coated with a heat sensitive material such as copper chloride or iron sulphate, or which is prepared in such a manner as to suffer change in color or shade under the influence of heat. Or, I may encircle or otherwise bring into contact with the body a fine wire mesh, the interstices of which contain a heat sensitive material of any kind, the sole requirement being that the heat indicating means shall be such as will be capable of visually depicting or otherwise indicating temperature.

While I have described in the main the application of my invention to the determination of the thickness of section, or the presence of non-uniformities or inhomogeneities in such articles of manufacture as pipes and tubings, it will be obvious to those skilled in the art that my invention is applicable to the examination of bodies of many different forms and that various modifications may be made in mode of operation and form, construction, and arrangement of the various cooperating parts, without departing from the spirit and scope of the following claims.

I claim:

1. The method of testing the homogeneity of a metallic object, which consists in coating a surface of said object with a fusible material, passing an electric current through said object, and noting variations in the state of such fusible material as the result of temperature changes.

2. The method of testing the homogeneity of a metallic object, which consists in coating a surface of said object with a fusible material, inducing an electric current in said object, and noting variations in the state of such fusible material as the result of temperature changes.

3. The method of testing uniformity of section of a metallic body, which consists in coating a surface of said body with a material which is fusible at a temperature somewhat above that of the surrounding atmosphere, supplying energy to said body so as to develop heat therein in inverse relation to its section at any region, and noting the effects of said heat on said fusible material.

4. The method of testing the homogeneity of a metallic body, which consists in supplying energy to said body so as to develop heat therein, applying to the surface of said body a material which varies its aspect according to the temperature to which it has been subjected, and noting therefrom variations in the distribution of said heat.

5. The method of detecting inhomogeneities in a metallic object, which consists in applying to the object a coating of heat sensitive material, heating the object by subjecting it to the effects of a magnetic field, and noting the characteristics of said coating resulting from such heating.

6. The method of detecting inhomogeneities in a metallic object, which consists in applying to the object a coating of fusible material, subjecting the object to the effects of a magnetic field so as to generate a current in said object, and noting the resultant fusing of said coating.

7. The method of detecting inhomogeneities in a metallic body, which consists in coating a surface of said body with a substance responsive to changes in temperature, subjecting the body to the action of a variable, non-uniform magnetic field so as to generate electric currents in said body which vary in magnitude in successive linear sections of the body, and noting variations in the linear characteristics of said coating as the result of the heating of said body by said electric currents.

8. The method of detecting non-uniformity in a metallic body, which consists in coating a surface of said body with a substance responsive to changes in temperature, subjecting the body to heating effects variable along one of its dimensions, and noting variations in the characteristics of said coating in the direction of said dimension as the result of said heating.

9. The method of testing the uniformity of a metallic body, which consists in increasing the temperature of said body by means of electric currents induced therein, and depicting isotherms on the surface of said body by means of heat-sensitive material applied thereon.

10. The method of testing the uniformity of a metallic body, which consists in increasing the temperature of said body by means of electric currents induced therein, and determining isotherms at the surface regions of said body.

11. The method of testing the uniformity of a metallic body, which consists in inducing electric currents in said body so as to increase its temperature, and measuring the density of said induced currents by means of a heat-sensitive material applied to a surface of said body.

12. The method of testing a metallic body for uniformity, which consists in inducing electric currents in said body so as to increase its temperature, and measuring variations in the density of said induced currents by means of a heat-sensitive material brought into proximity with a surface of said body.

13. The method of testing the uniformity of a metallic body from point to point which consists in applying to said body a substance sensitive to heat, inducing electric currents in said body in such manner that the heating effects of said currents in any region will be inversely proportional to the section of the body at that region and obtaining an indication of the isotherms at a surface of said body.

14. The method of testing a metallic body to determine the amount of material in a given region of the body, which consists passing an electric current through said region, and noting the amount of electric energy required to heat said region to a predetermined temperature.

15. The method of testing a metallic body to determine the amount of material in a given region of the body, which consists in coating said region with a fusible material, passing an electric current through said region, and noting the quantity of electric energy required to heat said region to the fusing point of said material.

16. The method of determining the quantity of material in a body which consists in applying to a surface of said body a substance fusible at a known temperature, heating said body by means of electric currents and measuring the time rate of electric current flow required to cause said substance to fuse.

17. The method of determining the quantity of material in a body which consists in bringing into proximity with said body a substance fusible at a known temperature, heating said body by means of electric currents and measuring the time rate of electric current flow required to cause said substance to fuse.

18. The method of determining the quantity of material in a body which consists in applying to a surface of said body a substance fusible at a known temperature, heating said body with an electric current, said substance being so disposed when fused as to open the circuit of said current, and measuring the time rate of current flow required to open said electric circuit.

19. The method of testing the homogeneity of a metallic object, which consists in coating a surface of the object with a material which changes its state when subjected to a predetermined temperature passing an electric current through the object to heat the same, and noting the effects of said heat on said material.

20. The method of testing uniformity of section of a metallic body, which consists in coating a surface of said body with a material which changes its state at a predetermined temperature, supplying energy to said body to develop heat therein in inverse relation to its section at any region, and noting the effects of said heat on said fusible material.

21. The method of testing a metallic body to determine the amount of material in a given region of the body which consists in passing a predetermined electric current through said region and noting the resulting increase in temperature.

22. The method of testing a metallic body to determine the amount of material in a given region of the body which consists in passing a predetermined quantity of electrical energy through the body and measuring the resulting rise in temperature in that region.

23. The method of testing a metallic body to determine the amount of material in a given region of the body which consists in passing a predetermined amount of electrical energy through the body and noting the difference in temperature between that at said region and a predetermined point included in the electrical circuit.

In testimony whereof, I have signed this specification.

ALFRED V. DE FOREST.